US009495282B2

(12) United States Patent
Varadharajan

(10) Patent No.: US 9,495,282 B2
(45) Date of Patent: Nov. 15, 2016

(54) METHOD AND SYSTEMS FOR A DASHBOARD TESTING FRAMEWORK IN AN ONLINE DEMAND SERVICE ENVIRONMENT

(75) Inventor: Arunkumaran Varadharajan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 678 days.

(21) Appl. No.: 13/010,252

(22) Filed: Jan. 20, 2011

(65) Prior Publication Data

US 2011/0314341 A1 Dec. 22, 2011

Related U.S. Application Data

(60) Provisional application No. 61/357,078, filed on Jun. 21, 2010.

(51) Int. Cl.
*G06F 9/44* (2006.01)
*G06F 11/36* (2006.01)

(52) U.S. Cl.
CPC .................... *G06F 11/368* (2013.01)

(58) Field of Classification Search
USPC .......................................................... 717/126
See application file for complete search history.

(56) References Cited

U.S. PATENT DOCUMENTS

| | | | |
|---|---|---|---|
| 5,394,347 A * | 2/1995 | Kita et al. ........................ 703/2 |
| 5,577,188 A | 11/1996 | Zhu | |
| 5,600,789 A * | 2/1997 | Parker et al. ............... 714/38.11 |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,781,720 A * | 7/1998 | Parker et al. ............... 714/38.11 |
| 5,790,117 A * | 8/1998 | Halviatti et al. ............... 715/744 |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,905,856 A * | 5/1999 | Ottensooser ................. 714/38.1 |
| 5,918,159 A | 6/1999 | Fomukong et al. | |
| 5,963,953 A | 10/1999 | Cram et al. | |
| 6,067,639 A * | 5/2000 | Rodrigues et al. ........ 714/38.11 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,371 B1 * | 9/2001 | Rucklidge ............. G06T 7/0081 358/462 |
| 6,295,530 B1 | 9/2001 | Ritchie et al. | |
| 6,324,568 B1 | 11/2001 | Diec et al. | |
| 6,324,693 B1 | 11/2001 | Brodersen et al. | |

(Continued)

*Primary Examiner* — Marina Lee
(74) *Attorney, Agent, or Firm* — Dergosits & Noah LLP; Todd A. Noah

(57) ABSTRACT

Testing a dashboard framework includes creating a model that captures the states of a GUI application and validates the states of the application by comparing it with benchmarks. The testing can include user interaction between the captured states of the GUI application. The ability to provide testing based upon recorded states of a web application can enable the test system to adapt to changes to the GUI software during product development or modification. Testing a dashboard framework is more efficient and flexible testing methods for GUI software.

16 Claims, 10 Drawing Sheets

(56) References Cited

U.S. PATENT DOCUMENTS

| | | | |
|---|---|---|---|
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,408,403 B1* | 6/2002 | Rodrigues et al. | 714/38.11 |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,622,298 B1* | 9/2003 | Stamm | 717/125 |
| 6,654,032 B1 | 11/2003 | Zhu | |
| 6,662,312 B1* | 12/2003 | Keller et al. | 714/38.14 |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,854,089 B1* | 2/2005 | Santee | G06F 11/3688 714/E11.208 |
| 6,898,764 B2* | 5/2005 | Kemp | 715/762 |
| 7,055,137 B2* | 5/2006 | Mathews | 717/125 |
| 7,062,502 B1 | 6/2006 | Kesler | |
| 7,340,411 B2 | 3/2008 | Cook | |
| 7,401,094 B1 | 7/2008 | Kesler | |
| 7,421,621 B1* | 9/2008 | Zambrana | 714/38.14 |
| 7,620,655 B2 | 11/2009 | Larsson | |
| 7,644,368 B2* | 1/2010 | Pins | 715/762 |
| 7,698,160 B2 | 4/2010 | Beaven et al. | |
| 7,810,070 B2* | 10/2010 | Nasuti et al. | 717/124 |
| 8,010,663 B2 | 8/2011 | Firminger et al. | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,185,917 B2* | 5/2012 | Grechanik et al. | 719/328 |
| 8,214,805 B2* | 7/2012 | Stewart | 717/125 |
| 8,275,836 B2 | 9/2012 | Beaven et al. | |
| 9,069,901 B2* | 6/2015 | Varadharajan | G06F 11/3672 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0133807 A1* | 9/2002 | Sluiman | 717/124 |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0052917 A1* | 3/2003 | Dubovsky | 345/764 |
| 2003/0056150 A1* | 3/2003 | Dubovsky | 714/38 |
| 2003/0065986 A1* | 4/2003 | Fraenkel et al. | 714/47 |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0098879 A1* | 5/2003 | Mathews | 345/762 |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0164854 A1* | 9/2003 | Polk | 345/762 |
| 2003/0182468 A1* | 9/2003 | Iline | 709/318 |
| 2003/0187921 A1 | 10/2003 | Diec et al. | |
| 2003/0189600 A1 | 10/2003 | Gune et al. | |
| 2003/0202012 A1* | 10/2003 | Kemp | 345/762 |
| 2003/0204427 A1 | 10/2003 | Gune et al. | |
| 2003/0206192 A1 | 11/2003 | Chen et al. | |
| 2003/0227480 A1* | 12/2003 | Polk | 345/762 |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0153837 A1* | 8/2004 | Preston et al. | 714/39 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0060610 A1* | 3/2005 | Leary et al. | 714/25 |
| 2005/0091098 A1 | 4/2005 | Brodersen et al. | |
| 2005/0152615 A1* | 7/2005 | Hutchinson | G06T 5/009 382/274 |
| 2005/0166094 A1* | 7/2005 | Blackwell et al. | 714/38 |
| 2005/0204298 A1* | 9/2005 | Kemp | 715/762 |
| 2005/0229043 A1* | 10/2005 | Nasuti et al. | 714/38 |
| 2006/0005170 A1* | 1/2006 | Rosaria et al. | 717/126 |
| 2007/0006043 A1* | 1/2007 | Pins | 714/38 |
| 2008/0127103 A1* | 5/2008 | Bak | 717/126 |
| 2008/0148235 A1* | 6/2008 | Foresti et al. | 717/123 |
| 2008/0310736 A1* | 12/2008 | Chattopadhyay | G06F 11/3692 382/218 |
| 2009/0055331 A1* | 2/2009 | Stewart | 706/11 |
| 2009/0063415 A1 | 3/2009 | Chatfield et al. | |
| 2009/0199160 A1* | 8/2009 | Vaitheeswaran et al. | 717/124 |
| 2009/0217309 A1* | 8/2009 | Grechanik et al. | 719/328 |
| 2009/0273597 A1* | 11/2009 | Chatamballi et al. | 345/418 |
| 2010/0205475 A1* | 8/2010 | Ebrahimi | G06F 21/6227 714/2 |
| 2011/0004868 A1* | 1/2011 | Bharadwaj | 717/135 |
| 2011/0314341 A1* | 12/2011 | Varadharajan | G06F 11/368 714/38.1 |
| 2012/0047489 A1* | 2/2012 | Varadharajan | G06F 11/3672 717/124 |

* cited by examiner

572 —
```
Dashboard Component
Row: 0 Column: 0
Type: Gauge
Header: Edit Header
Title: Edit Title
Footer: Edit Footer
Report: Source:
NameOrId:
x-form-el-units
Type:
Options
Visible:
true
Content:
Selected: Auto
Available: [Auto, Whole Units, Hundreds, Thousands, Millions, Billions, Trillions]
--------------------------

NameOrId:
x-form-el-type
Type:
Options
Visible:
false
--------------------------
```

.
.
.
.

574 —
```
--------------------------
NameOrId:
x-form-el-gauge1Color
Type:
Color Picker
Visible:
true
Content:
Selected Color: rgb(194, 194, 84)
--------------------------

NameOrId:
x-form-el-gauge2Color
Type:
Color Picker
Visible:
true
Content:
Selected Color: rgb(84, 194, 84)
```

FIGURE 3A

576 — 
```
Dashboard Component
Row: 3 Column: 0
Type: Table
Header: Edit Header
Title: Edit Title
Footer: Edit Footer
Report: Source:
NameOrId:
x-form-el-units
Type:
Options
Visible:
true
Content:
Selected: Auto
Available: [Auto, Whole Units, Hundreds, Thousands, Millions, Billions, Trillions]
------------------------------

NameOrId:
x-form-el-type
Type:
Options
Visible:
false
------------------------------
```

.
.
.
------------------------------

```
NameOrId:
x-form-el-gauge2Color
Type:
Color Picker
Visible:
false
------------------------------
```

FIGURE 3B

```
testSimple(){ selenium.open("/newDashboard");

selenium.dragAndDrop("chart", "canvas");

assertCanvasState();

} assertCanvasState(){

String state;

for(Component comp: canvas.getElements()){

State += comp.getState();

}

State.replace(System.date(),"TODAY");// normalization
to replace today's date storeAndValidate(state);//read benchmark from file and
compare.

}

TextComponent{ getState(){ return selenium.getValue(name);

}

}

ComplexComponent{ getState(){ for(PrimitiveComponent c:
getPrimitiveComponents()){ state += c.getState();

return state;

}

}

}
```

FIGURE 4

METHOD AND SYSTEMS FOR A DASHBOARD TESTING FRAMEWORK IN AN ONLINE DEMAND SERVICE ENVIRONMENT

CLAIM OF PRIORITY

This application claims the benefit of U.S. Provisional Patent Application 61/357,078 entitled, METHODS AND SYSTEMS FOR A DASHBOARD TESTING FRAMEWORK IN AN ONLINE DEMAND SERVICE ENVIRONMENT by Arunkumaran Varadharajan, filed Jun. 21, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to methods and system for a user interface dashboard testing framework in an on-demand services environment.

BACKGROUND

In conventional graphical user interface (GUI) of software such as software as a service (SaaS) must be tested to validate the correctness of the user interface element by acquiring and validating their attributes and appearances. An approach to testing in the industry is to programatically crawl through the GUI page making assertions for the correctness for the attributes for each of the elements of interest. This approach is only efficient and effective if the objective of the test is limited to a number of properties of a few elements. However, this approach becomes cumbersome if the GUI pages have greater numbers of elements because the number of assertions increases in an exponential manner as both the number of elements and their possible attributes increases. Another drawback of this approach is that it is not inherently extensible. Thus, a test written for a GUI page cannot be directly used for another GUI page since the objective of the test which concerns what needs to be verified is also tied to the actual verification implementation. A typical enterprise software application has numerous visual elements of various types and numerous attributes for each of its pages. Yet another level of complexity is introduced by the fact that these elements are not independent. Even a single user interaction can trigger changes in a number of the elements on the page or related pages which can either be synchronous or asynchronous.

Unfortunately, conventional GUI page testing approaches might become inefficient and ineffective if, for example, the GUI page being tested is relatively complex. The conventional crawling of the GUI pages may also be relatively slow.

Accordingly, it is desirable to provide techniques enabling efficient and flexible testing of the GUI page to improve performance and efficiency of the testing of the GUI software.

BRIEF SUMMARY

In accordance with embodiments, there are provided mechanisms and methods for testing a dashboard framework in an online demand service environment. These mechanisms and methods for testing a dashboard framework can enable embodiments to provide more efficient and flexible testing methods for GUI software. The ability of embodiments to provide testing based upon recorded states of a web application can enable the test system to adapt to changes to the GUI software during product development or modification. The general methodology employed in testing the GUI of software such as SaaS is to validate the correctness UI elements by acquiring and validating their attributes and appearance.

In an embodiment and by way of example, methods and systems for a dashboard testing framework in an online demand service environment are provided. The method embodiment includes creating a model that captures the state of the application and validating the state of the application by comparing it with a benchmark. This approach may decouple what needs to be tested from the verification data and may comprehensively validate any changes since the state can be recorded at any given point in time.

While one or more implementations and techniques are described with reference to an embodiment in which testing a dashboard framework in an online demand service environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 3A-3B illustrate examples of benchmark values for testing the GUI application dashboard;

FIG. 4 is an example of programming code for testing a dashboard framework in an online demand service environment in an embodiment;

DETAILED DESCRIPTION

Systems and methods are provided for testing a dashboard framework in an online demand service environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing testing a dashboard framework in an online demand service environment will be described with reference to example embodiments.

The following detailed description will first describe setting up data for the application in accordance with aspects and embodiments. Validating the state before and after user action is then detailed. Following the description of validating the state, processing the results is described.

Figure 1:
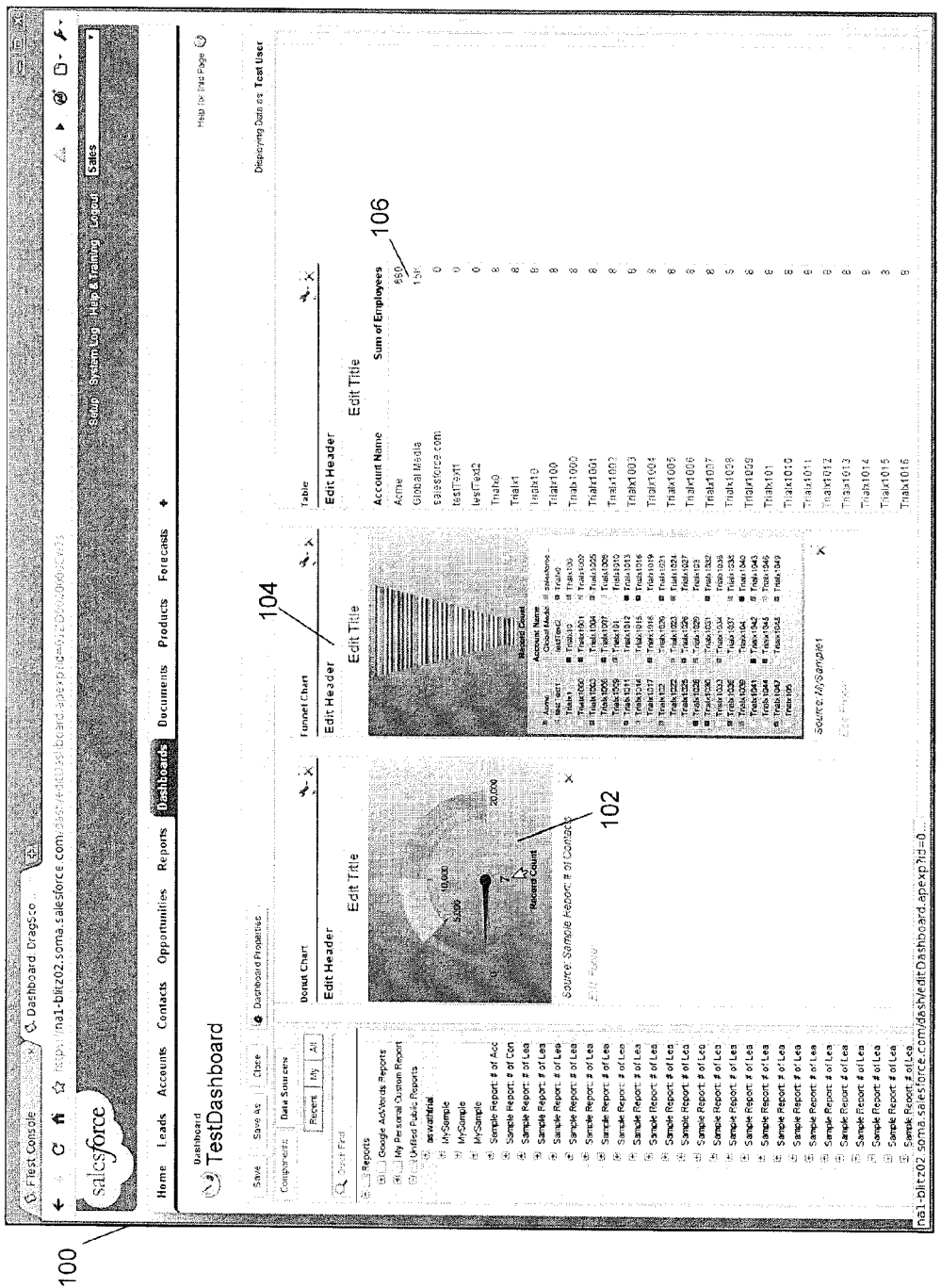
FIG. 1 illustrates a representative web browser with a GUI application for testing a dashboard framework in an online demand service environment in an embodiment.

FIG. 1 illustrates a representative test dashboard framework in an online demand service environment in an embodiment. The test dashboard can be a collection of information areas. In an embodiment, a user can assemble the dashboard by drag and dropping chart types into one portion of the dashboard and drag and dropping report types into another area of the dashboard. The user can also define the properties of the charts and reports on the test dashboard. The dashboard can have various controls including buttons, sliders and other data input fields that create a graphical user interface (GUI). In this example, a dashboard 100 can include a donut chart 102, a funnel chart 104 and a table 106 that can be dragged and dropped into the displayed locations. It can be extremely important for the GUI to provide accurate information to the user. Thus, the GUI must be tested.

In the past, a GUI was created and then each piece of the display would be tested. Thus, a test system would look at the GUI, detect the data input and then check the display to determine if the output was correct. This type of test method is specific to the GUI that is being tested. This test method is also inflexible because any alteration of the GUI can alter the other test fields. Thus, the GUI must be tested after each user interaction.

In contrast to a system that tests each variable output from the GUI, an embodiment of the system can be used to test one or more of the important features of each of the data windows and charts. The features can include: text, numbers, formatting, language, currency and other appearance characteristics of the displayed windows and charts. The testing of the features can include the accuracy of the data as well as the proper placement and formatting of the data. Testing the GUI of a web-application can involve making numerous assertions at every stage/interaction to validate the correctness of the functionality of the GUI.

An objective of the described testing system is to ensure that each user interaction transitions the state of the GUI application into the next expected state. If the interaction transitions the state of the GUI application into an unexpected state, the system can detect the non-compliance and generate an appropriate error message. The GUI application can then be fixed or modified and retested. The inventive system and method for testing GUI applications is an improvement over known traditional testing approaches. The traditional approach to testing uses ad-hoc assertions that are error prone and inefficient. Further, the traditional approach may not always return a suitable error message that aids in quickly identifying the cause of the error.

An alternative approach that is suggested here is to define the state of the application/functionality that is under testing. Subsequently, each transition/interaction in the test is immediately followed by an assertion that validates the state against a benchmark and generates an error.

Figure 2:
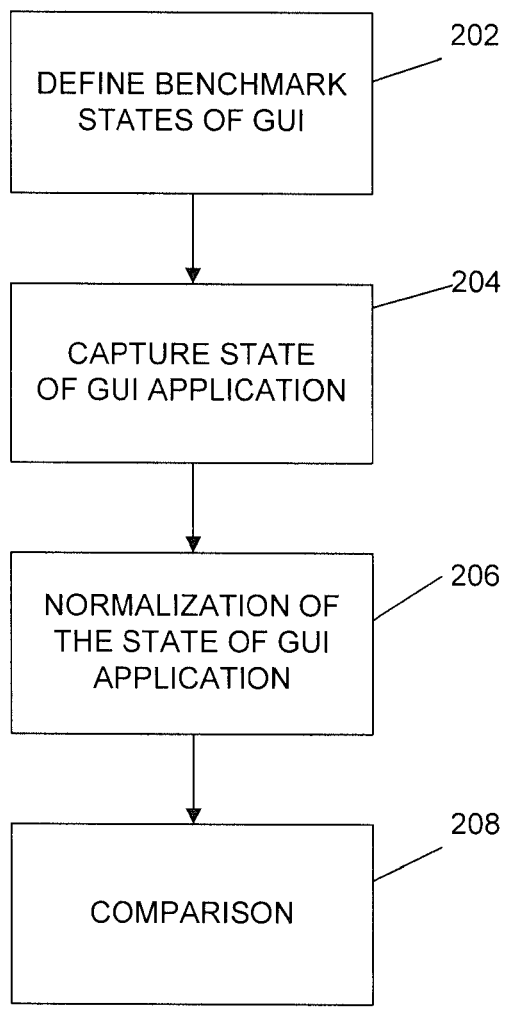
FIG. 2 is an operational flow diagram illustrating a high level overview of a technique for testing a dashboard framework in an online demand service environment in an embodiment.

FIG. 2 is an operational flow diagram illustrating a high level overview of a technique for testing a dashboard framework in an online demand service environment in an embodiment. As shown in FIG. 2, the process includes defining benchmark states 202, capturing the benchmark states 204 and normalizing the benchmark states 206. The normalized benchmark states can then be compared to the detected states 208. By way of example, and without limitation, the defining of the benchmark states 202 can include identifying the important primitives that are part of the GUI state definition. The state of a GUI application is a composition of the states of the individual components on the GUI. The individual components can include a plurality of primitive elements like text boxes, labels, etc. The system framework allows the tester to define the state of each of the primitive elements. The element states can be specific information such as: numerical values, text, colors, dates, etc.

The state of the more complex components can be a composition of multiple primitive elements. Thus, the state of the complex components can be defined by the states of the primitive elements in the complex components. The tester can also structure the test to only include the components that are important. In some cases, some of the primitive elements may not be important and can be omitted from the GUI state definition. By applying a paradigm similar to Object Oriented Programming, the system framework allows the tester to define the states of an entire GUI application by identifying the components that are important and hence a part of the GUI state definition.

Because all the tests can use the same state definitions for comparison, a standard GUI state definition can be established and modified. For example, while at initial stages of GUI application development, the tester might be interested only in components that have a higher priority. However, as the GUI application is developed, more components can be added to the GUI state definition. The system frame work allows the GUI state definition to be easily modified to include additional state elements as the GUI application is developed or modified.

In an embodiment, the benchmark states can be generated on a test run of the GUI application. The tester may inspect each element of interest and manually validate the attribute value for each of these elements. The cumulative attribute benchmarks that have been validated by the tester can define a benchmark state of the GUI application.

With reference to FIGS. 3A and 3B, an example of an embodiment of the attribute benchmark values is illustrated. In this example, dashboard framework can include a gauge which can be a complex component having a number of component elements. The first portion 572 of the benchmark data can include location and text elements. The location can be described as row and column. For example, "Row: 0 Column: 0" can indicate the upper left location and "Type: Gauge" can indicate that the feature is a gauge. The text values for the header, title footer and report as also listed. In this example, "name:x-form-el-units" indicates that the name of the component is x-form-el-units, "type:options" indicates that the element is a combobox/picklist content. "Selected:auto" indicates that the selected option is auto. "Available:[auto, whole Units, Hundreds, Thousands, Millions, Billions, Trillions]" is the listing of available options for "Selected:auto."

The testing can be performed by comparing an expected value to an actual detected value. For example, the expected value can be "selected—auto" and the detected value can be "selected—whole." The system may detect that there is a bug in the picklist and the selected option was supposed to be "whole" instead of "auto." The verification library may indicate that the test failed to provide an output indicating location as well expected and actual output.

With reference to the second portion 574, a first color element value and a second color element value of the gauge are described. The first color element is rgb (194, 194 and 84) and the second color element is rgb (84, 194, 84). These numeric values represent the chromaticies of red, green and blue respectively, on a scale from 0 to 255. The combination of the color chromaticies can produce a specific color. In this example, the first color element, rgb (194, 194, 84) is yellow and the second color element, rgb (84, 194, 84) is green. The third portion 576 of the benchmark data can include the location of a table element located at Row: 3 and Column: 0 as well as the header, title and footer text. The benchmark data in the first portion 572 and the second portion 574 can correspond to the donut chart 102 illustrated in FIG. 1 and the benchmark data in the third portion 576 can correspond to the table 106 illustrated in FIG. 1.

With reference to FIG. 2, after the benchmark states of the GUI application have been defined, the actual states of the GUI can be captured 204. By way of example and without limitation, the state of a primitive element such as a textbox or a pick list is a collection of GUI attributes. In an embodiment, a software testing framework is used to test the GUI applications. An example of a suitable testing framework is "Selenium" which is a portable software testing framework for web applications. Selenium provides a record/playback tool for authoring tests without learning a test scripting language. Selenium provides a test domain specific language (DSL) to write tests in a number of popular programming languages. Selenium is a commonly used tool that can mimic user interactions within a browser in a testing environment. The Selenium tool also allows for acquiring properties of an element and this framework uses Selenium to retrieve the attributes of each of the elements.

With reference to FIG. 4, an example of a possible code is illustrated that outlines some of the processing steps that can be used in the GUI application testing process. The Selenium tool can be used to create a new dashboard having a chart and a canvas that are dragged and dropped on the dashboard 452. The canvas can be a complex component and the code then gets the elements of the canvas to obtain the canvas state. The GUI application test process can define the state of the canvas by obtaining the states of the canvas elements 454. One of the GUI application elements can be the date which changes daily. The system can normalize the date by replacing it with an attribute value in a canonical format 456. The GUI application test process can then store and validate the state of the GUI application by reading the benchmark values and comparing them to the state element values 458. For text components, the test framework may compare the captured text value to the benchmark text value 460. For complex components, the system framework may get the primitive components and compare the states of the primitive components to the benchmark values of the primitive components 462.

Figure 5:
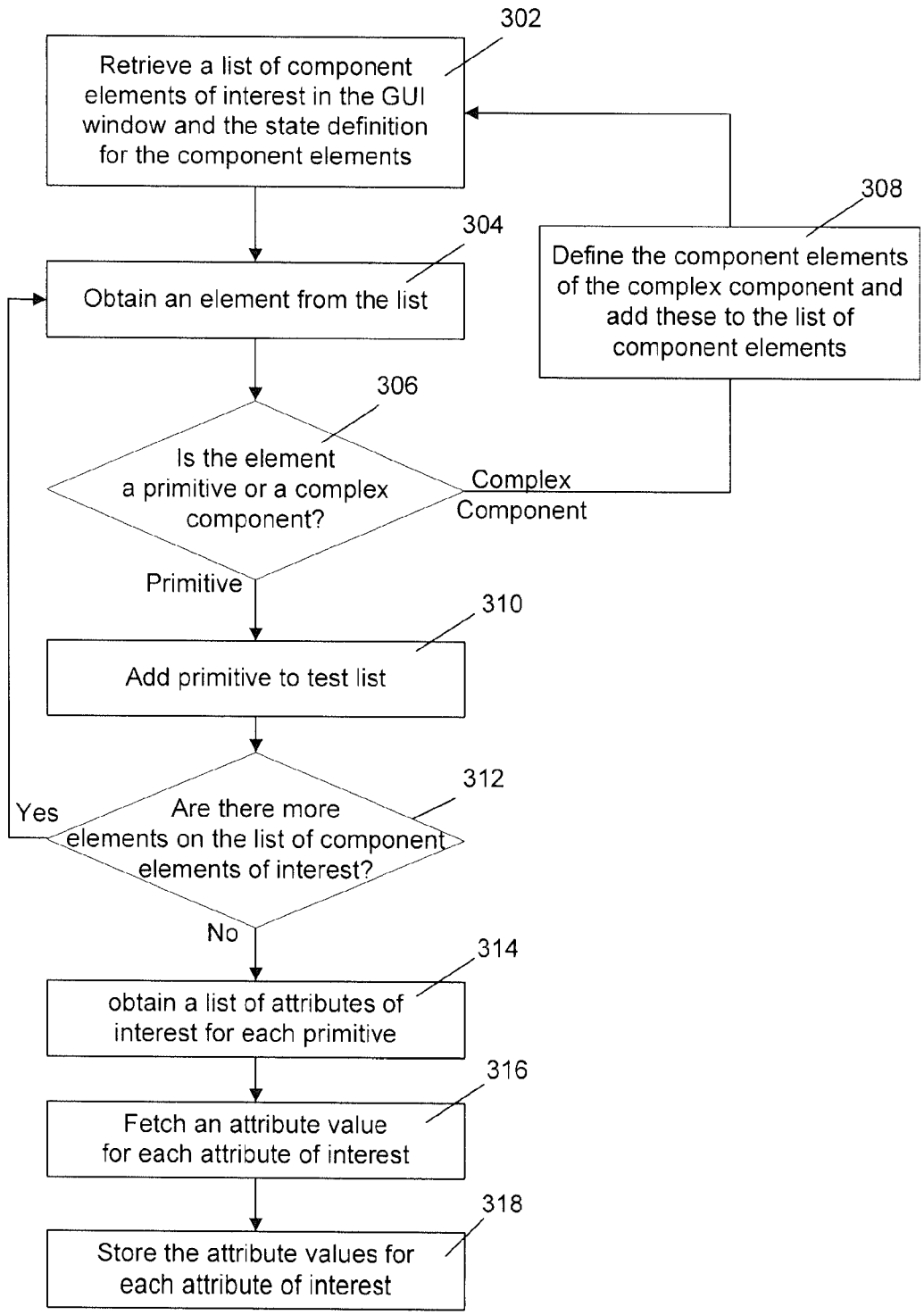
FIGS. 5-7 are operational flow diagrams illustrating a high level overview of techniques for testing a dashboard framework in an online demand service environment in an embodiment.

The system can capture the state of a window in various different ways. As an example with reference to FIG. 5, the capturing of the state of the GUI application can be performed by the following steps. The test system can retrieve the list of components of interest in the GUI window and a state definition for each of these components 302. In an embodiment, one element is processed at a time. The system can select one of the elements from the list of components of interest 304. The system can then determine if the element is a primitive or a complex component 306. If the element is a complex component, the system can define the component elements of the complex component 308. The component elements of the complex component 308 are added to the list of component elements 302.

If the element is a primitive, the primitive is added to the test list 310. A list of attributes is obtained for each primitive 312 and a benchmark value is obtained for each attribute of interest 314. The system will then determine if there are more elements on the list of component elements of interest 312. If there are more elements, the system can obtain the next element of interest from the list 304 and repeat the described steps 304-308. If there are no more elements on the list of components elements of interest, the system can obtain a list of attributes of interest for each primitive 314. The system can then obtain a value for each attribute of interest 316. The system can then store the values for each attribute of interest 318 in a computer memory. In an embodiment, the fetching and storing of the benchmark value for each attribute of interest can be performed by the Selenium software tool. The cumulative values for the attributes of interest on the GUI between user interactions can be referred to as the state of the GUI.

After the state has been captured, the state of the GUI application can be normalized 206. Normalization can be the process of converting the captured GUI state element attribute values into a canonical format that can remove the GUI application attributes that can change from one run to another. The system can provide a dictionary or a database of reusable common objects and definitions of canonical format that can provide a foundation for a decoupled, consistent, reusable integration methodology. The canonical format can be in the form of XML schema built from the common model objects. The normalization of the attribute values to a canonical format can provide consistency and re-usability while ensuring data integrity.

For example, in an embodiment the GUI application can include an attribute of interest that is a primitive element which is a date field. The date field tracks the date and changes each day. Thus, the captured state of the GUI application would contain the date retrieved from the UI. The tester can know that the date will change every day and configure the test system to normalize the captured date element value so that the normalized value will match the corresponding benchmark data for the date element. The expected date can be replaced by a fixed and unique string in the canonical format which can be a text based format like plain text or xml. For example, the program code used to normalize the date element can be: State.replace-(System.date( ), "TODAY").

In the application framework, normalization can be performed on a number of elements such as dates, system generated IDs, etc. In an embodiment, the system framework can identify the elements that need to be normalized and the system framework can then normalize the GUI captured test results in the required manner. Normalization can be applied to various types of data including: dates, identifications, images, etc. For example, a date such as "01/01/2011" can be normalized to "TODAY." An identification number or code, such as "000XXXXXXXXX" can be normalized to "SalesforceID." An image such as <img src="/chart-server/?a=34&b=df34&c=456" can be normalized to "ChartUrl." Various other normalization can be applied to the elements.

Figure 6:
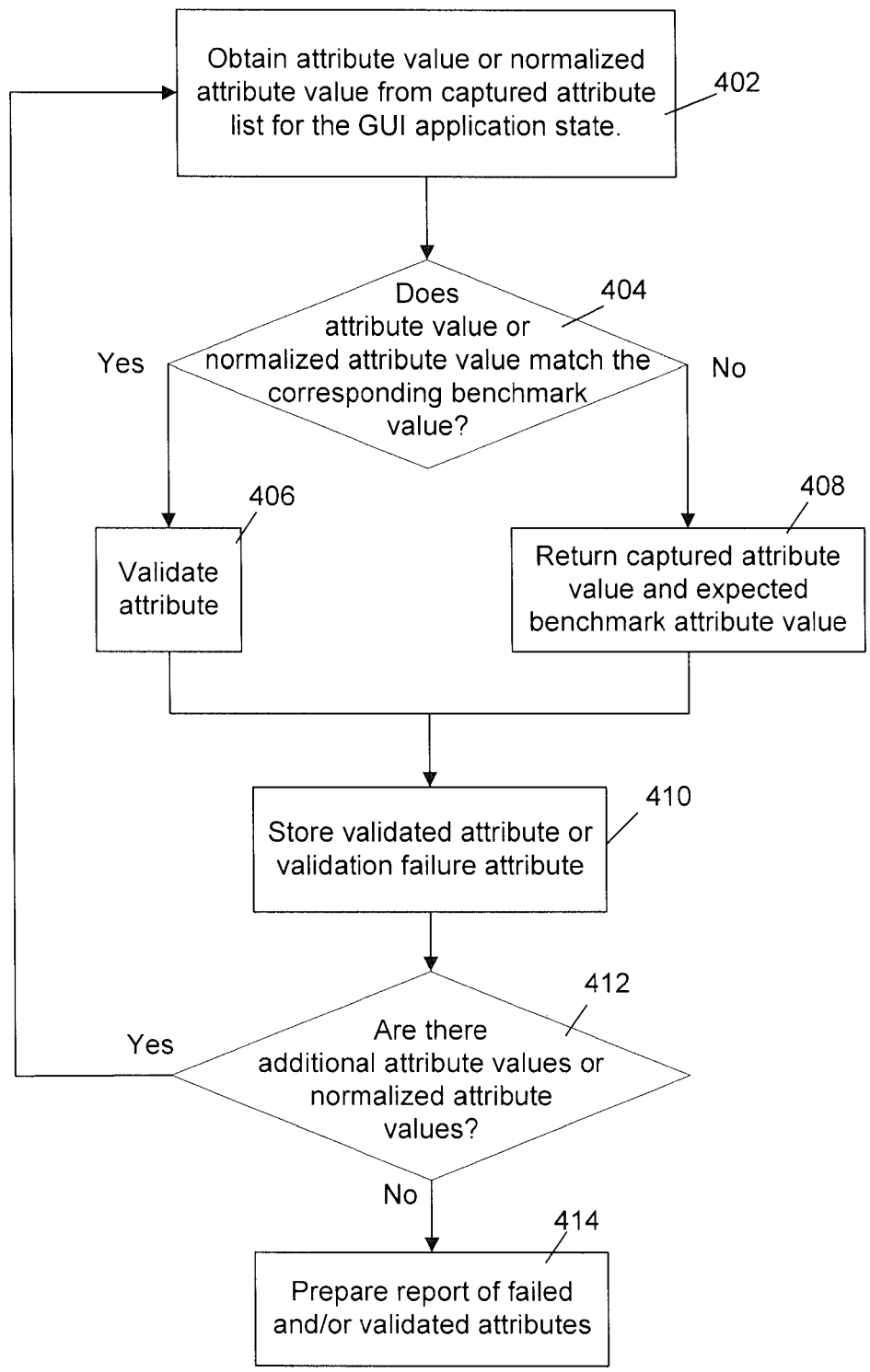

After the state of the GUI application has been captured and the required normalization has been applied, the system framework can compare the captured and normalized test elements to the benchmark values defined by the tester. With reference to FIG. 6, a flowchart illustrating an embodiment of the comparison process is illustrated. The system framework obtains the stored list of attribute values and normalized attribute values from the captured attribute list for the GUI application state 402. The system then compares each of the captured attribute values and the normalized attribute values to benchmark values for the GUI application state 404. If the attribute value or normalized attribute value matches the benchmark value, this element of the GUI application is validated 406. However, if the attribute value or normalized attribute value does not match the benchmark value, the system returns the captured attribute value and the expected benchmark attribute value 408. The validated attribute or the validation failure attribute can be stored in a computer memory 410. The system framework can then determine if there are additional attribute values or normalized attribute values 412. If there are additional attribute values, the system can repeat steps 402-412. If there are no more attribute values or normalized attribute values, the system framework can prepare a report that can summarize the test results 414. The report can include the failed attributes and may also include the validated attributes. In other embodiments, the report can only include the validated attributes.

An embodiment of the process used to test a state of the GUI application has been described. It is also possible to the described test procedures to test numerous states of the GUI application. After each GUI application state, there can be user actions. With reference to FIG. 6, the system framework can setup the data for a series of GUI application states 502. The setup of the data might include setup/configuration information such as language, currency or actual data processed by the application.

In other embodiments, the data setup 502 can be abstract from the rest of the test. A separate setup provider can perform the data setup 502 before the test runs and then perform the associated cleanup after the test is complete. The abstraction of the data can allow for the same test to be run for different data sets. The data setup 502 can basically consist of creating dashboards in the test environment before running a test. A number of tests can be run on a given data setup. The implementation of the dashboard test framework can isolate the verification from the data setup 502. Since the results are compared against a benchmark, the coupling between data setup 502, verification methodology and actual assertions is broken.

The system can then begin the test process of defining a data model by capturing the GUI application state and validating the application state 504. As discussed above, the data model of the GUI application page in the browser can be a collection of elements of interest. Each of the elements can be represented as a collection of attributes wherein each attribute can be identified uniquely by an identifier such as a name. The state of the named attribute can be represented completely by a string representation which can be referred to as a value. Hence the data model of the page is a collection of name and value pairs for each element of the GUI application state. The GUI test application can capture the name and values for each element of interest to describe a first state. These captured element values are then compared to the benchmark values for these elements.

Figure 7:
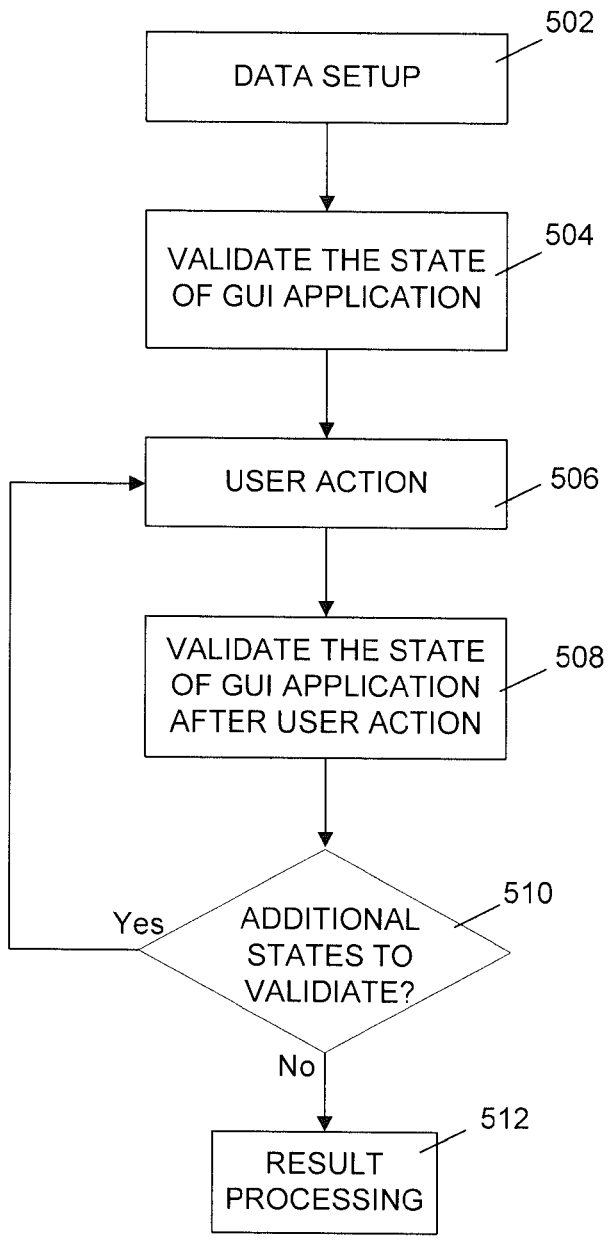

With reference to FIG. 7, in an embodiment, the GUI application state may be validated before a user interaction and the GUI application state can be validated before a user interaction. Thus, the GUI application state can be recorded before and after the user actions. A typical test would consist of a number of user interactions followed by verification.

In an embodiment, the user interaction can be mimicked by using libraries of interactions in standard browser based testing frameworks. The initial GUI application state can be validated prior to user action 504. The validation process can include capturing the GUI application state and comparing the element or normalized element values to the benchmark values. The element and normalized element values that match the benchmarks are validated and the element values that do not match the benchmarks fail validation. The validated and failed validation data can be stored. The user can then interact with the GUI application 506 and the same validation process can be performed for the GUI application state after the user interaction 508. The system can test or validate many GUI application states and after each state is tested, the system frame work may determine if there are any additional GUI application states to validate 510. If there are additional states to validate, additional user action 506 can be performed and validate the GUI application state after each additional user action 508. In an embodiment, the described testing process can continue until there are no additional states to validate.

At the end of the GUI application state tests, the system framework can process the results 512 and present the results of the testing in a format that allows for easy identification of cause in case of failure. The report can include validation failures that include string based representations of the elements. The string based representations allow for identifying exact portions of the GUI application states that don't match the corresponding bench marks. The string based representations can be used to quickly and accurately trace the cause of the validation failures to specific elements and their attributes.

The process for comparing the captured states of the GUI application to the benchmark values can be further enhanced by employing a wide variety of comparison libraries and tools. For example, in an embodiment, the system can be configured to make simple library calls like assertResult("folder/benchmarkFileInDisk", actualResultAsString) or assertImage("folder/benchmarkFileInDisk", actualImageAsBytes)

Figure 8:
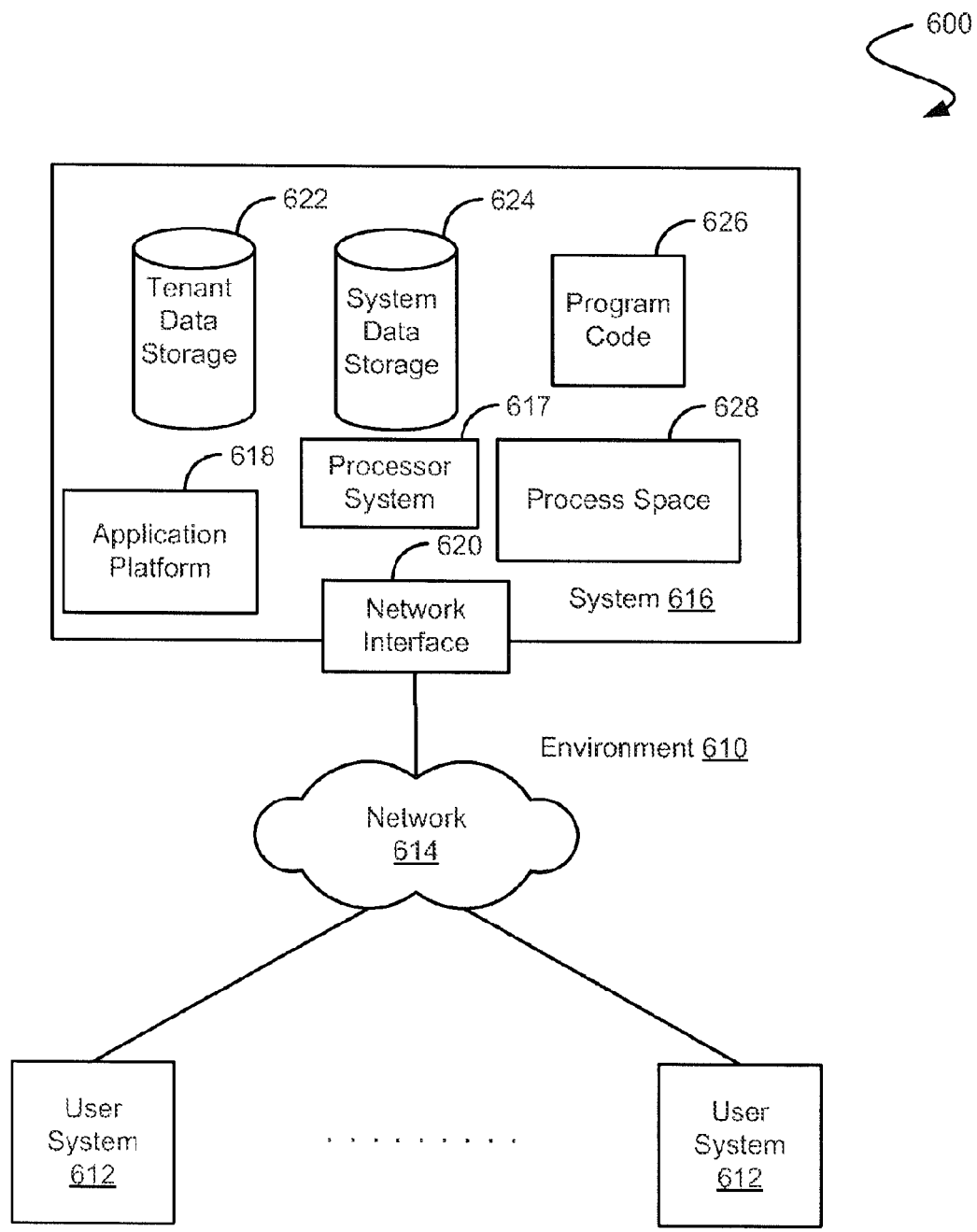
FIG. 8 illustrates a block diagram of an example of an environment wherein an on-demand database service might be used.

FIG. 8 illustrates a block diagram of an environment 610 wherein an on-demand database service might be used. Environment 610 may include user systems 612, network 614, system 616, processor system 617, application platform 18, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 8 (and in more detail in FIG. 9) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 8, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 8, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 8 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
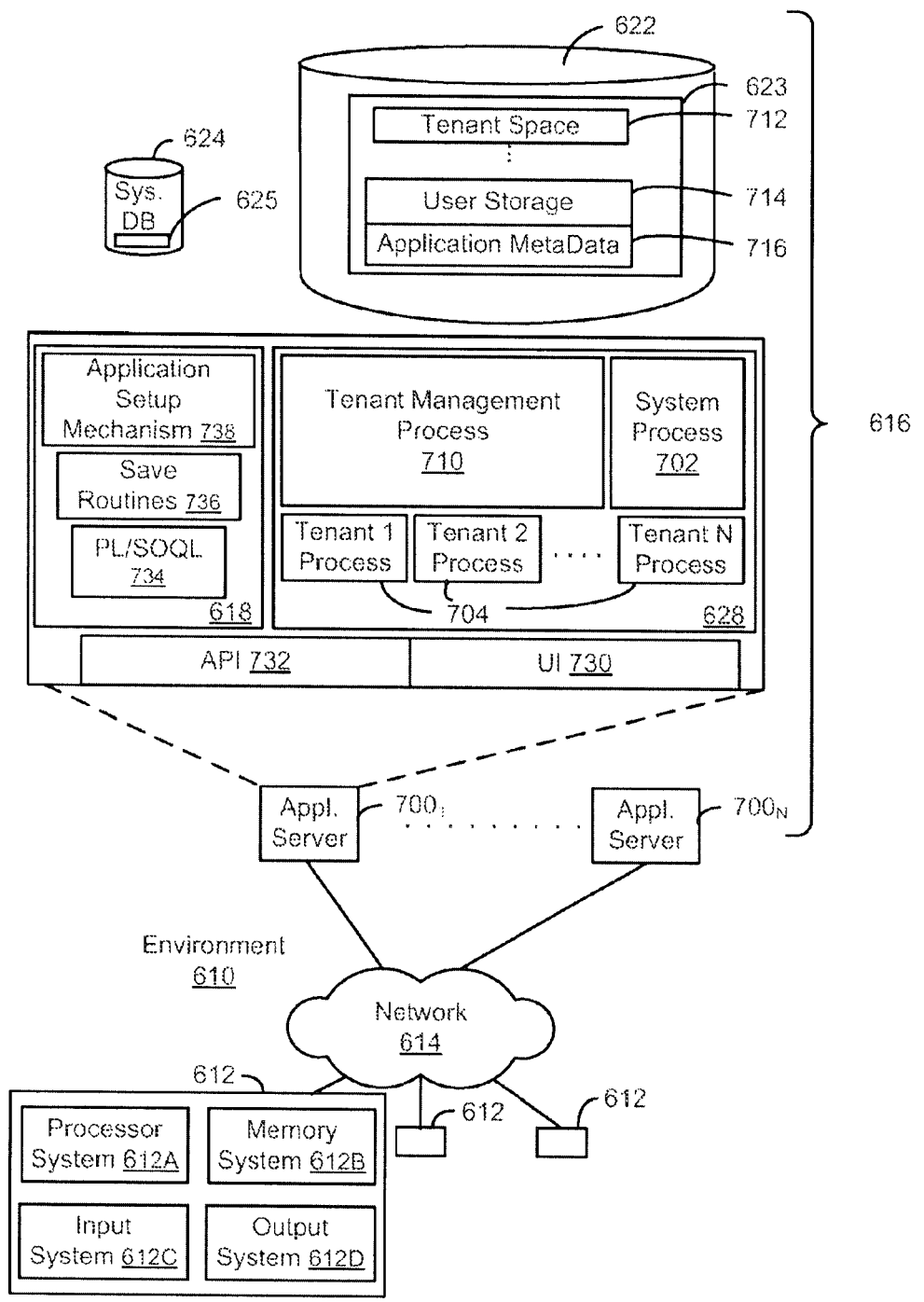
FIG. 9 illustrates a block diagram of an embodiment of elements of FIG. 7 and various possible interconnections between these elements.

FIG. 9 also illustrates environment 610. However, in FIG. 9 elements of system 616 and various interconnections in an embodiment are further illustrated. FIG. 9 shows that user system 612 may include processor system 612A, memory system 612B, input system 612C, and output system 612D. FIG. 9 shows network 614 and system 616. FIG. 9 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 1000$_1$-1000$_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 8. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 9, system 616 may include a network interface 620 (of FIG. 8) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for testing a dashboard framework in an online demand service environment, the method comprising:
identifying a Graphical User Interface (GUI) application created by a computing system and displayed on a display of the computing system, the GUI application having a plurality of elements on the online demand service environment;
capturing a first set of text values for the plurality of elements for the GUI application in a first state, each text value of the first set of text values representing an element attribute;
normalizing at least some of the first set of text values of the plurality of elements to remove the text value element attributes and to form a set of normalized values for the at least some of the first set of text values of the plurality of elements by replacing a first text value element attribute of the first set of text values in the GUI application with a first canonical value that matches a first corresponding benchmark value for a first corresponding element, the first canonical value replacing the text value element attributes associated with the GUI application that change from a first run of the GUI application to a second run of the GUI application;
comparing the first set of normalized values for the plurality of elements with a first set of benchmark values for the GUI application in the first state; and
validating the first set of normalized values for the plurality of elements when the first set of normalized values for the plurality of elements matches the first set of benchmark values for the GUI application in the first state.

2. The method of claim 1, wherein the first set of benchmark values includes values for at least one of: a text box, a pull down menu and a graphical feature.

3. The method of claim 1, wherein the first set of normalized values includes at least one of: a date and a system generated identification (ID).

4. The method of claim 1, further comprising:
capturing a second set of text values for the plurality of elements for the GUI application in a second state, each text value of the second set of text values representing an element attribute;
normalizing at least some of the second set of text values of the plurality of elements to remove the element attributes and form a second set of normalized values for the plurality of elements by replacing a second value of the second set of text values in the GUI application with a second canonical value that matches a second corresponding benchmark value for a second corresponding element;
comparing the second set of normalized values for the plurality of elements with a second set of benchmark values for the GUI application in the second state; and
validating the second set of normalized values for the plurality of elements when the second set of normalized values for the plurality of elements matches the second set of benchmark values for the GUI application in the second state.

5. A non-transitory machine-readable medium carrying one or more sequences of instructions for testing a dashboard framework in an online demand service environment, which instructions, when executed by one or more processors, cause the one or more processors to carry out the steps of:
identifying a GUI application created by a computing system and displayed on a display of the computing system, the GUI application having a plurality of elements on the online demand service environment;
capturing a first set of text values for the plurality of elements for the GUI application in a first state, each text value of the first set of text values representing an element attribute;
normalizing at least some of the first set of text values of the plurality of elements to remove the text value element attributes and to form a set of normalized values for the at least some of the first set of text values of the plurality of elements by replacing a first text value element attribute of the first set of text values in the GUI application with a first canonical value that matches a first corresponding benchmark value for a first corresponding element, the first canonical value replacing the text value element attributes associated with the GUI application that changes from a first run of the GUI application to a second run of the GUI application;
comparing the first set of normalized values for the plurality of elements with a first set of benchmark values for the GUI application in the first state; and
validating the first set of normalized values for the plurality of elements when the first set of normalized values for the plurality of elements matches the first set of benchmark values for the GUI application in the first state.

6. The non-transitory machine-readable medium as recited in claim 5, wherein the instructions for capturing a first set of text values for the plurality of elements for the GUI application in a first state includes capturing values for at least one of: a text box, a pull down menu and a graphical feature.

7. The non-transitory machine-readable medium as recited in claim 5, wherein the instructions for normalizing at least some of the first set of text values of the plurality of elements by replacing the first value of the first set of text values with the first canonical value that matches the first corresponding benchmark value for the first corresponding element to form a first set of normalized values for the plurality of elements includes instructions for normalizing at least one of: a date and a system generated ID.

8. The non-transitory machine-readable medium as recited in claim 5, further comprising instructions for carrying out the steps of:
  capturing a second set of text values for the plurality of elements for the GUI application in a second state, each text value of the second set of text values representing an element attribute;
  normalizing at least some of the second set of text values of the plurality of elements to remove the element attributes and form a second set of normalized values for the plurality of elements by replacing a second value of the second set of text values in the GUI application with a second canonical value that matches a second corresponding benchmark value for a second corresponding element;
  comparing the second set of normalized values for the plurality of elements with a second set of benchmark values for the GUI application in the second state; and
  validating the second set of normalized values for the plurality of elements when the second set of normalized values for the plurality of elements matches the second set of benchmark values for the GUI application in the second state.

9. An apparatus for testing a dashboard framework in an online demand service environment, the apparatus comprising:
  a processor; and
  one or more stored sequences of instructions which, when executed by the processor, cause the processor to carry out the steps of:
  identifying a GUI application created by a computing system and displayed on a display of the computing system, the. GUI application having a plurality of elements on the online demand service environment;
  capturing a first set of text values for the plurality of elements for the GUI application in a first state, each text value of the first set of text values representing an element attribute;
  normalizing at least some of the first set of text values of the plurality of elements to remove the text value element attributes and to form a set of normalized values for the at least some of the first set of text values of the plurality of elements by replacing a first text value element attribute of the first set of text values in the GUI application with a first canonical value that matches a first corresponding benchmark value for a first corresponding element, the first canonical value replacing the text value element attributes associated with the GUI application that changes from a first run of the GUI application to a second run of the GUI application;
  comparing the first set of normalized values for the plurality of elements with a first set of benchmark values for the GUI application in the first state; and
  validating the first set of normalized values for the plurality of elements when the first set of normalized values for the plurality of elements matches the first set of benchmark values for the GUI application in the first state.

10. The apparatus of claim 9 wherein the one or more stored sequences of instructions which, when executed by the processor, cause the processor to carry out the step of capturing a first set of text values for the plurality of elements for the GUI application in a first state includes instructions for capturing values for at least one of: a text box, a pull down menu and a graphical feature.

11. The apparatus of claim 9 wherein the one or more stored sequences of instructions which, when executed by the processor, cause the processor to carry out the step of normalizing at least some of the first set of text values of the plurality of elements by replacing the first value of the first set of text values with the first canonical value that matches the first corresponding benchmark value for the first corresponding element to form a first set of normalized values for the plurality of elements includes instructions for normalizing at least one of: a date and a system generated ID.

12. The apparatus of claim 9 wherein the one or more stored sequences of instructions which, when executed by the processor, further cause the processor to carry out the steps of:
  capturing a second set of text values for the plurality of elements for the GUI application in a second state, each text value of the second set of text values representing an element attribute;
  normalizing at least some of the second set of text values of the plurality of elements to remove the element attributes and form a second set of normalized values for the plurality of elements by replacing a second value of the second set of text values in the GUI application with a second canonical value that matches a second corresponding benchmark value for a second corresponding element;
  comparing the second set of normalized values for the plurality of elements with a second set of benchmark values for the GUI application in the second state; and
  validating the second set of normalized values for the plurality of elements when the second set of normalized values for the plurality of elements matches the second set of benchmark values for the GUI application in the second state.

13. A method for transmitting code for testing a dashboard framework in an online demand service environment on a transmission medium, the method comprising:
  transmitting code to identify a GUI application having a plurality of elements on the online demand service environment;
  transmitting code to capture a first set of text values for the plurality of elements for the GUI application in a first state, each text value of the first set of text values representing an element attribute;
  transmitting code to normalize at least some of the first set of text values of the plurality of elements to remove the text value element attributes and to form a set of normalized values for the at least some of the first set of text values of the plurality of elements by replacing a first text value element attribute of the first set of text values in the GUI application with a first canonical value that matches a first corresponding benchmark value for a first corresponding element, the first canonical value replacing the text value element attributes associated with the GUI application that changes from a first run of the GUI application to a second run of the GUI application;
  transmitting code to compare the first set of normalized values for the plurality of elements with a first set of benchmark values for the GUI application in the first state; and
  transmitting code to validate the first set of normalized values for the plurality of elements when the first set of normalized values for the plurality of elements matches the first set of benchmark values for the GUI application in the first state.

14. The method for transmitting code for testing a dashboard framework in an online demand service environment on a transmission medium, as recited in claim 13, wherein the instructions for capturing a first set of text values for the plurality of elements for the GUI application in a first state includes instructions for capturing values for at least one of: a text box, a pull down menu and a graphical feature.

15. The method for transmitting code for testing a dashboard framework in an online demand service environment on a transmission medium, as recited in claim 13, wherein the instructions for normalizing at least some of the first set of text values of the plurality of elements by replacing the first value of the first set of text values with the first canonical value that matches the first corresponding benchmark value for the first corresponding element to form a first set of normalized values for the plurality of elements includes instructions for normalizing at least one of: a date and a system generated ID.

16. The method for transmitting code for testing a dashboard framework in an online demand service environment on a transmission medium, as recited in claim 13, further comprising instructions for carrying out the steps of:
    capturing a second set of text values for the plurality of elements for the GUI application in a second state, each text value of the second set of text values representing an element attribute;
    normalizing at least some of the second set of text values of the plurality of elements to remove the element attributes and form a second set of normalized values for the plurality of elements by replacing a second value of the second set of text values in the GUI application with a second canonical value that matches a second corresponding benchmark value for a second corresponding element;
    comparing the second set of normalized values for the plurality of elements with a second set of benchmark values for the GUI application in the second state; and
    validating the second set of normalized values for the plurality of elements when the second set of normalized values for the plurality of elements matches the second set of benchmark values for the GUI application in the second state.

\* \* \* \* \*